Aug. 21, 1962 C. M. CAMPBELL, JR 3,050,714

SHIFT REGISTER

Filed June 19, 1959 3 Sheets-Sheet 1

INVENTOR.
CARL M. CAMPBELL, JR.
BY John R. Manning
AGENT

SHIFT REGISTER

Filed June 19, 1959

INVENTOR.
CARL M. CAMPBELL, JR.
BY John R. Manning
AGENT

Aug. 21, 1962 C. M. CAMPBELL, JR 3,050,714

SHIFT REGISTER

Filed June 19, 1959 3 Sheets-Sheet 3

*INVENTOR.*
CARL M. CAMPBELL, JR.

*BY* John R. Manning

AGENT

United States Patent Office 3,050,714

Patented Aug. 21, 1962

3,050,714
SHIFT REGISTER

Carl M. Campbell, Jr., Broomall, Pa., assignor to Burroughs Corporation, Detroit, Mich., a corporation of Michigan Filed June 19, 1959, Ser. No. 821,497
7 Claims. (Cl. 340—173)

This invention relates to shift registers and more particularly to binary shift registers having a plurality of stages for storing binary numbers.

Numerical information may be stored in a shift register in binary form wherein one state of a bistable device represents the storage of a "one" and the other state represents the storage of a "zero." The shift register comprises a plurality of bistable storage devices so interconnected that binary information may be inserted into the register and advanced from one storage device to another by the application of signals to the devices forming the shift register stages. Binary information may be read into or out of a shift register either serially or in a parallel. For example, the digital number 6, represented as 0110 in binary form, may be serially inserted into the register by reading a "zero," which is the least significant digit of the binary number 0110, into the first bistable storage device in the register. By a series of signals the least significant "zero" is shifted to its adjacent storage device and the next significant digit, a "one," is read into the storage device that previously stored the least significant "zero." Subsequently, the "zero" and the "one" are shifted to the following stages and the third digit, which is a "one," is read into the first storage device. The reading in and shifting of the digits continues until the binary number 0110 is inserted into the shift register. In parallel operation, the four digits would be read directly into the storage device or stage that is ultimately to receive and store the digit.

When a shift register shifts information from one bistable device to a second bistable device, it has been necessary to interpose a delay in the shifting process to allow resetting before reading in of the information into the subsequent bistable device. This operation is known to be slow and not always dependable in operation. The present invention contemplates the reading in of information into a storage device at a clock pulse time followed by the read-out of the information from the first stage to the subsequent stage and read-in of new information into the first stage at the immediately following clock pulse time. That is to say, information may be read into the stage at odd numbered clock pulse times, for example, and read out at even numbered clock pulse times. Further, a form of the invention requires no resetting and consequently no clock pulse times are necessary for this operation.

It is therefore, an object of this invention, to improve shift register operation.

It is a further object of the invention to reduce the operating time of shift registers.

It is another object of the invention to increase the reliability of shift register operation.

It is still another object of the invention to provide a circuit capable of reading in information at a clock pulse time and shifting the same bit of information at the immediately following clock pulse time.

It is yet another object of the invention to provide a shift register which requires no resetting.

It is also a further object of the invention to provide a checking circuit after each stage of the many stages of a shift register.

The foregoing objects, advantages, construction and operation of the present invention will become more readily apparent from the following description and accompanying drawings, in which.

*Description of Invention*

Figure 1:
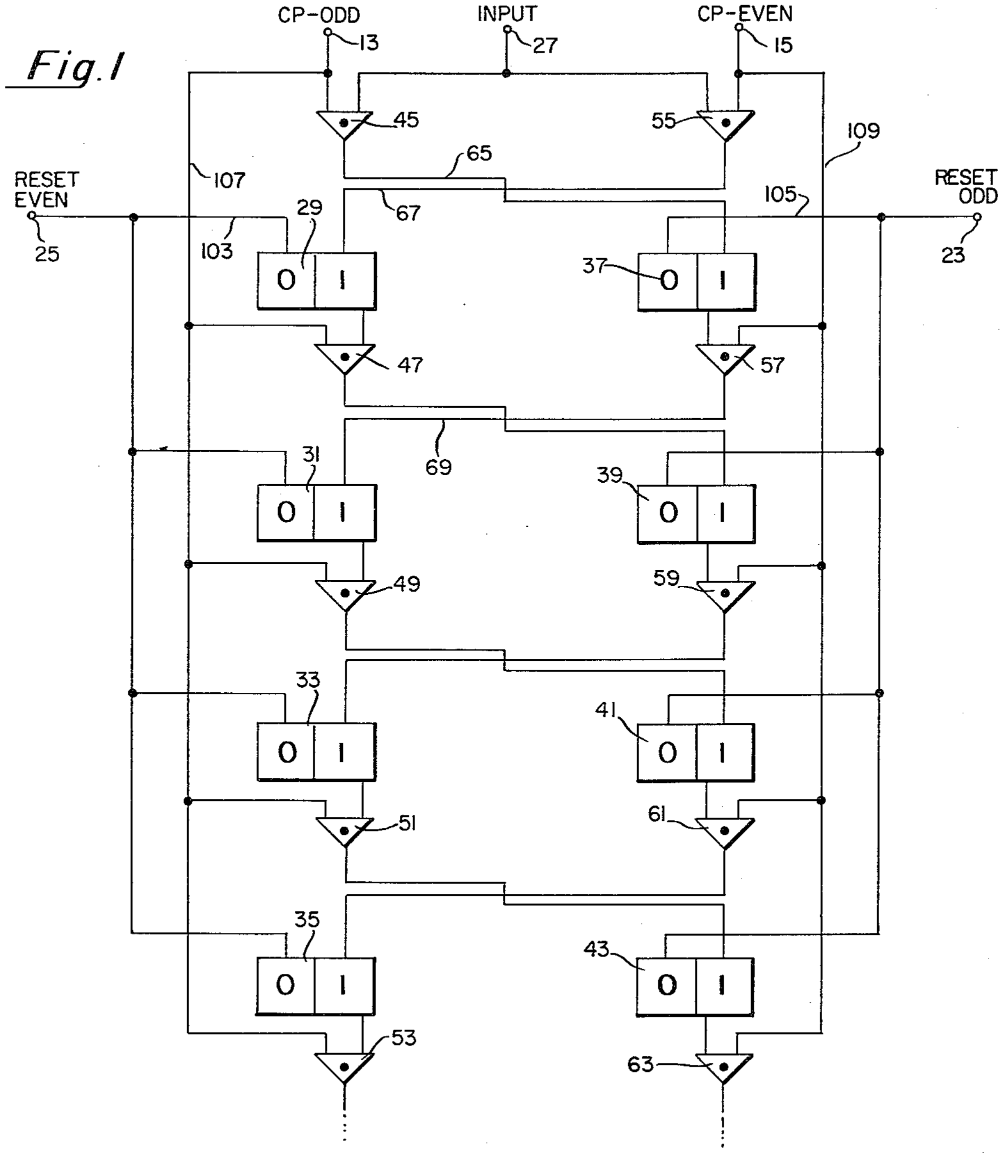
FIGURE 1 is a block diagram disclosing four stages of the shift register.

There is disclosed in FIGURE 1, a block diagram of four stages of a shift register as proposed by the invention. It is understood that any number of stages may be used, the number depending upon the word length that is desired.

To the "and" gates 45 and 55, which may be of the type shown on page 398 or 400 of "Pulse and Digital Circuits" by Millman and Taub, published by McGraw-Hill (1956), are applied the input information signals and the clock signals or pulses. The input terminal 27 is coupled to both the "and" gates 45 and 55. The second input to the "and" gate 45 is the CP-Odd (clock pulse odd or the odd numbered clock pulses such as the first, third, fifth, etc.) and the second input to the "and" gate 55 is the CP-Even (clock pulse even or the even numbered clock pulses such as the second, fourth, sixth, etc.).

Each stage of the shift register comprises a pair of bistable devices which may be any components or circuits having two stable states such as magnetic cores, vacuum tubes (including for example, bistable multivibrators or flip-flops), gas tubes, ferroelectrics, relays, etc. The bistable devices in the circuit of FIGURE 1 comprise the blocks numbered 29, 31, 33, 35, 37, 39, 41, and 43.

The output of the "and" gate 55 is coupled to the "one" input side of the bistable device 29 through the conductor 67. Similarly, the output of the "and" gate 45 is coupled to the "one" side of the bistable device 37 through the conductor 65. Coupled to the "zero" input of the bistable device 29, as well as to the bistable devices 31, 33, and 35, is the conductor 103 which is coupled to the terminal 25 over which the even reset pulses are applied. Similarly, coupled to the "zero" input side of the bistable device 37, as well as the bistable devices 39, 41, and 43, is the conductor 105, which is coupled to the terminal 23 wherein the odd reset pulses are applied.

The inputs to the "and" gate 47, which follow the first stage of the shift register, are from the "one" output of the bistable device 29 and the conductor 107 from the CP-Odd terminal 13. The output of the "and" gate 47 is directed to the "one" input side of the bistable device 39. The inputs to the "and" gate 57, which follow the first stage of the shift register, are from the "one" output side of the bistable device 37 and from the conductor 109 which is coupled to the CP-Even terminal 15. The output of the "and" gate 57 is coupled to the "one" input side of the bistable device 31 through the conductor 69.

The remainder of the shift register stages is coupled similar to that as described for the first stage.

Figure 2:
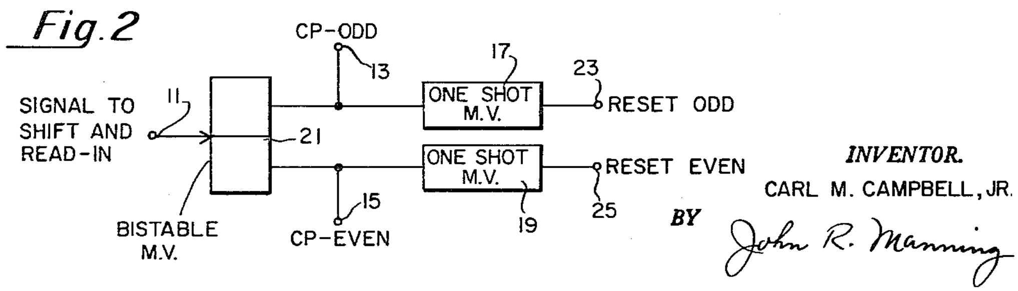
FIGURE 2 is a block diagram of the circuits necessary for the operation of FIGURE 1.

FIGURE 2 discloses in block form the pulse generation means to operate the circuit of FIGURE 1. The box 21 may be a bistable multivibrator, which is well known in the art, and the boxes 17 and 19 may be any of the one-shot multivibrators which are well known. Upon application of an external signal to shift and read-in at the terminal 11 of FIGURE 2, the wave form of which is shown at *a* of FIGURE 3, to the bistable multivibrator 21, an output will be derived first at the CP-Odd terminal 13 and upon the application of a second signal to the terminal 11, an output will be derived at the CP-Even terminal 15. Upon subsequent application of pulses to the terminal 11, clock pulses appear alternately at the terminals 13 and 15.

Figure 3:
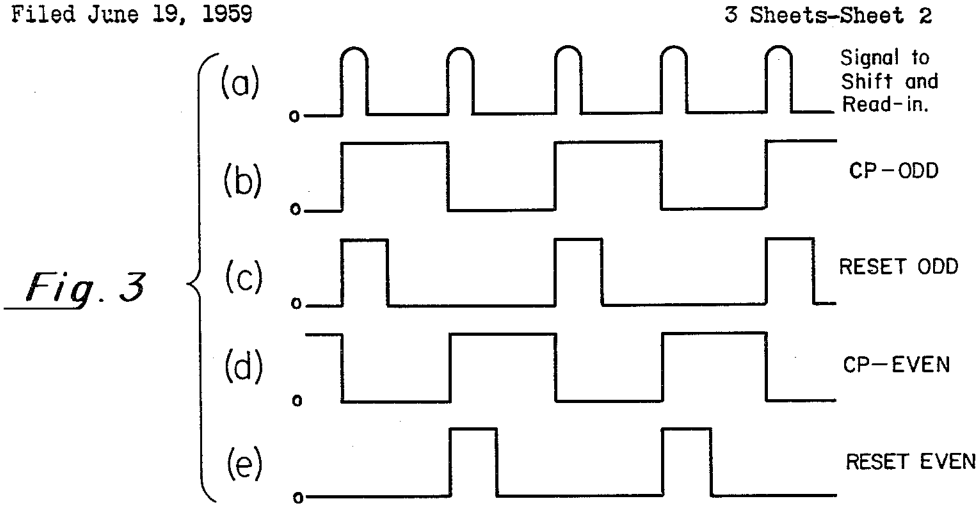
FIGURE 3 shows the wave forms derived from the circuit of FIGURE 2.

An output of the multivibrator 21 is also coupled to the one-shot multivibrator 17 and the other output of the multivibrator 21 is coupled to the one-shot multivibrator 19. Therefore, for each pulse appearing at the terminal 13, a reset odd pulse is generated at the terminal 23 which is shown in *c* of FIGURE 3. Similarly, for each pulse appearing at the terminal 15, a reset even pulse is generated at the terminal 25 which is shown in FIGURE 3 at *e*. The wave forms of CP-Odd and CP-Even are shown at *b* and *d* respectively of FIGURE 3.

Figure 4:
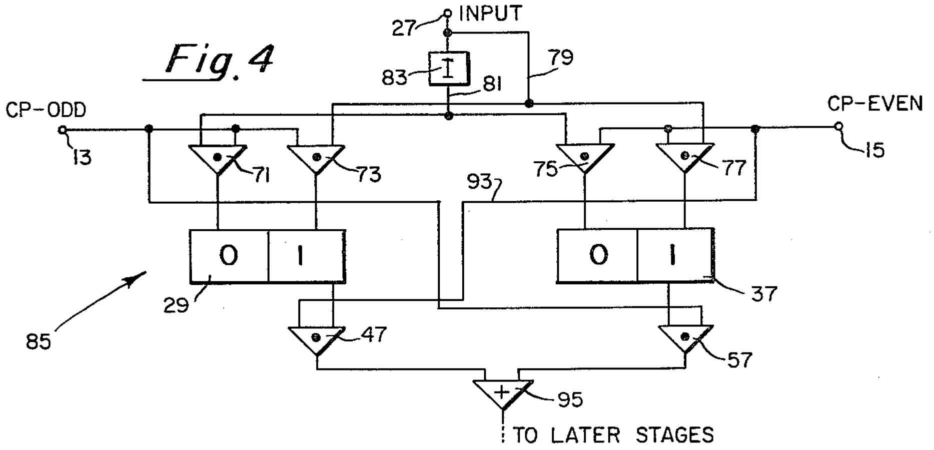
FIGURE 4 is a block diagram of a shift register requiring no resetting, which is a modification of one of the stages of FIGURE 1.

Referring now to FIGURE 4, a modification of one stage of the shift register disclosed in FIGURE 1 is shown. With the addition of a pair of "and" gates and an inverter, the bistable devices no longer require resetting.

Input information is applied to the input terminal 27 and relayed to the "and" gates 73 and 77 over the conductor 79. The input information is also applied to the inverter 83 and then to the "and" gates 71 and 75 over the conductor 81. The function of the inverter is to change "one" signals into "zero" signals and "zero" signals into "one" signals; i.e., a "one" signal appearing at the input terminal 27 appears as a "zero" signal on the conductor 81 and a "zero" signal at the input terminal 27 appears as a "one" signal on the conductor 81. A circuit capable of performing this function may be found on page 401 or page 402 of the aforementioned book by Millman and Taub.

CP-Odd is coupled to the "and" gates 71, 73 and 57. Similarly, CP-Even is coupled to the "and" gates 75, 77 and 47.

The output of the "and" gate 71 is coupled to the "zero" input of the bistable device 29; the output of the "and" gate 73 is coupled to the "one" input of the bistable device 29; the output of the "and" gate 75 is coupled to the "zero" input of the bistable device 37; and, the output of the "and" gate 77 is coupled to the "one" input of the bistable device 37. The "one" output of the bistable device 29 is coupled to the "and" gate 47 and the "one" output of the bistable device 37 is coupled to the "and" gate 57. The outputs of the "and" gates 47 and 57 are coupled to the inputs of the "or" gate 95.

Figure 5:
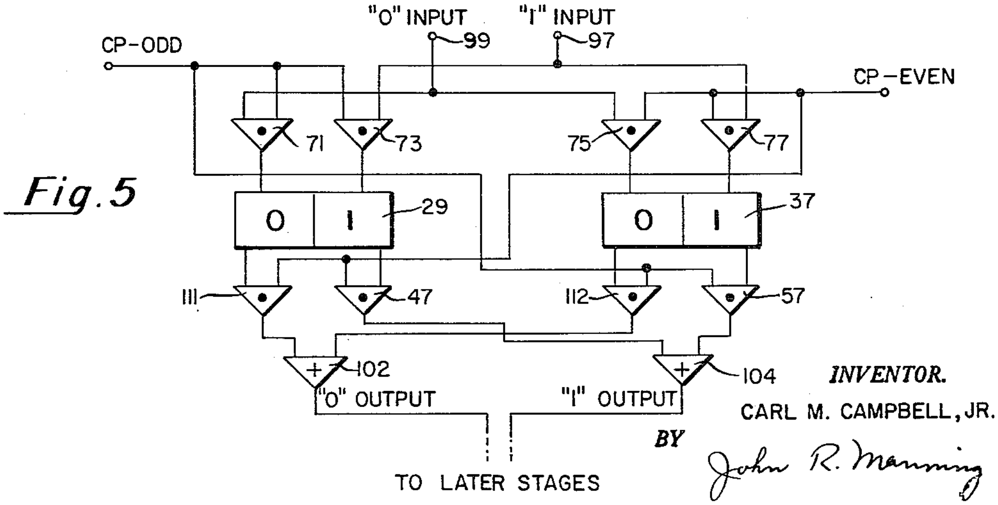
FIGURE 5 is a further modification of one of the shift register stages of FIGURE 1.

FIGURE 5 discloses a variation of the shift register stages disclosed in FIGURES 1 and 4. The inventer 83 of FIGURE 4 has been eliminated and the binary inputs have been separated by allowing the "zero" input signals to be applied to the terminal 99 and then to the "and" gates 71 and 75. The "one" signals are applied to the terminal 97 and to the "and" gates 73 and 77. The clock pulse signals are applied to the input "and" gates similarly as in FIGURE 4.

The output of FIGURE 5 now comprises, for each bistable device, a pair of "and" gates and an "or" gate.

The "zero" output of the bistable device 29 is coupled to the "and" gate 111; the "one" output of the bistable device 29 is coupled to the input of the "and" gate 47; the "zero" output of the bistable device 37 is coupled to the input of the "and" gate 112; and, the "one" output of the bistable device 37 is coupled to the "and" gate 57. CP-Odd signals are applied to the "and" gates 112 and 57 and CP-Even signals are applied to the "and" gates 111 and 47. The output of the "and" gates 111 and 112 are coupled to the input of the "or" gate 102. The outputs of the "and" gates 47 and 57 are coupled to the "or" gate 104. The outputs of the "or" gates 102 and 104 can be arranged to lead to subsequent stages of the shift register.

Figure 6:
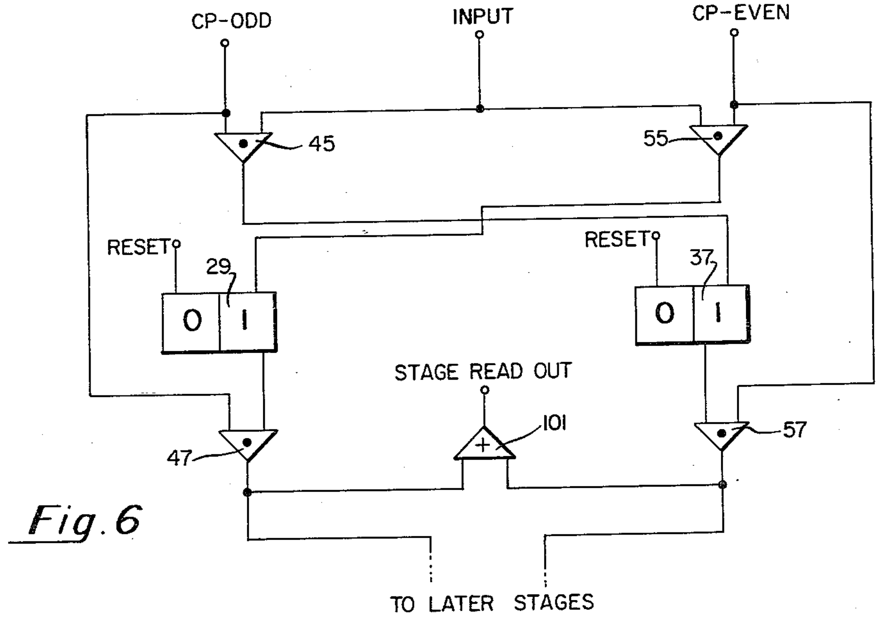
FIGURE 6 is a further modification of a stage of the shift register of FIGURE 1.

A stage of the shift register of FIGURE 1 has been modified in FIGURE 6 by the addition of the "or" gate 101 at the outputs of the "and" gates 47 and 57. As noted later, the addition of the "or" will allow read-out or checking after each stage.

Figure 7:
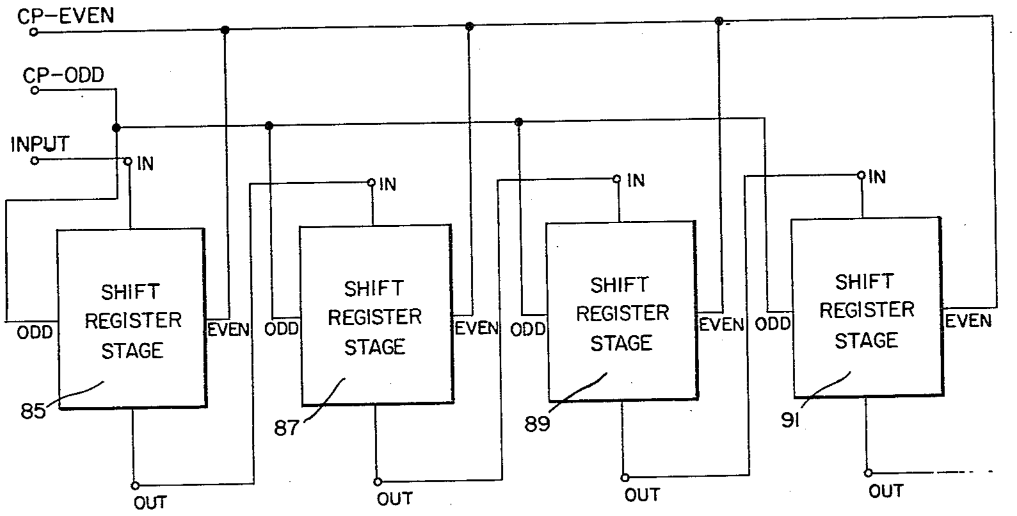
FIGURE 7 is a block diagram disclosing four shift register stages.

The circuit of FIGURE 7 is a block form diagram of a shift register comprising four stages. CP-Odd signals are applied to the odd inputs of the stages 85, 87, 89 and 91 and CP-Even signals are applied to the even inputs of the stages. Information is inserted into the first stage 85 through the input terminal and is shifted to the stage 87 over the "out" terminal of stage 85 to the "in" terminal of stage 87. The information continues to shift to subsequent stages as long as desired.

*Description of Operation*

Before a description of how the binary number is read into and shifted within the shift register, reference will be made to FIGURE 2 and 3. FIGURE 2 discloses in block form the type of circuit elements necessary to produce the clock signals or pulses and the reset pulses for operation of the shift register. FIGURE 3 discloses the waveforms of the signals associated with the circuit of FIGURE 2.

The signal to shift and read-in, as shown in line *a* of FIGURE 3, is applied to the terminal 11 of FIGURE 2. The CP-Odd (odd numbered clock pulses), as shown in line *b* of FIGURE 3, emanates from the CP-Odd terminal 13 of FIGURE 2. Similarly, CP-Even (even numbered clock pulses), the wave form which is shown in line *d* of FIGURE 3, emanates from the CP-Even terminal of FIGURE 2. The Reset Odd signals, which are generated by the one shot multivibrator 17 at the terminal 23, the wave form which is shown in line *c* of FIGURE 3, are applied to reset the bistable devices appearing on the right hand side of FIGURE 1 and the Reset Even pulses, from the terminal 25 and which are generated by the one shot multivibrator 19 of FIGURE 2, the wave form which is shown in line *e* of FIGURE 3, are applied to the Reset Even terminal to reset the bistable devices appearing at the left hand side of the drawing.

Referring now to FIGURE 1, the operation of the circuit will be described. For the purposes of explanation, we will assume that we wish to insert the binary number 0111 into the shift register. The binary number is read into the shift register from right to left, i.e., the least significant digit, which is the furthermost right hand digit and a "one" in the binary number 0111, is read into the shift register first, followed by the next most significant digit, and so on.

It will be assumed for purposes of explanation that before the application of the information pulses to the input terminal 27, all the bistable devices 29, 31, 33, 35, 37, 39, 41 and 43 are in their "zero" or reset state or condition. With the application of a pulse representative of the least significant digit of the binary number 0111 to the input terminal 27, CP-Odd is simultaneously generated and applied to the terminal 13 at the "and" gate 45. As there is coincidence at the "and" gate 45, a pulse is transmitted over the conductor 65 to the bistable device 37 to set it into its "one" state. At this point the output of the bistable device 37 to the "and" gate 57 is made "high" (a voltage appears at the output terminal of the bistable device 37). Simultaneously, with the application of CP-Odd to the terminal 13, Reset Odd was applied to the terminal 23 to place the bistable devices 37, 39, 41 and 43 in their "zero" state. However, it is to be noted from FIGURE 3, lines *b* and *c*, that CP-Odd is of longer duration than Reset Odd, thus allowing CP-Odd to override the Reset Odd during the condition that it is desirous to place a "one" into a bistable device. If a "zero" is to be read into the bistable device, the information pulse representing the "zero," which can be represented by the absence of a pulse, would not override the Reset Odd pulse and the bistable device would remain in its "zero" or reset state if already there or return to its "zero" state if in its "one" state. To summarize this feature, both Reset Odd and Reset Even are pulses which will tend to set the bistable devices into the "zero" state but if a "one" is being shifted into a bistable device by a clock pulse, and since the "one" signal is of longer duration than the reset signal, the bistable device will end up being set into its "one" position rather than being reset in its "zero" position.

The operation thus far, relating to information read-in, has resulted in the shifting of the least significant digit, which is a "one" of the binary number 0111 into the bistable device 37. All other bistable devices are clear or in their "zero" state. Upon application of the second or next pulse, which will be CP-Even, we will wish to shift the "one" presently stored in hte bistable device 37 to the bistable device 31 and at the same time read the second most significant digit of the binary number 0111 into the bistable device 29 and this is accomplished in the following manner: Coincidence is provided at the inputs of the "and" gate 55 by the simultaneous application of the information pulse representative of a "one" to the input terminal 27 and the application of CP-Even at the terminal 15. Simultaneously, Reset Even is applied to the terminal 25; however, the bistable device 29 will not be reset because the information pulse from the "and" gate 55 over the conductor 67 to the bistable device 29 is of longer duration than the Reset Even pulse, thus placing the bistable device 29 in its "one" state. At the same time that CP-Even is applied to the terminal 15, it is to be noted that CP-Even is simultaneously applied to the "and" gates 57, 59, 61 and 63 to shift to the next stage any information that may be contained in their respective bistable devices. As previously noted a "one" had been stored in the bistable device 37 and during this condition an output is provided from the bistable device 37 to the "and" gate 57. Upon application of CP-Even, as previously noted, coincidence occurs at the "and" gate 57 and a pulse is passed to the bistable device 31 over the conductor 69, thus setting the bistable device 31 in its "one" state. The pulse arriving over the conductor 69 was of longer duration than Reset Even and thus the bistable device 31 ended up in its "one" state rather than being reset into its "zero" state.

To summarize the operation thus far, the least two significant digits of the binary number 0111 have been read into the shift register of FIGURE 1 and are contained in the bistable devices 31 and 29.

The operation of read-in, resetting and shifting continues until the entire binary number is placed into the shift register. At the conclusion of the read-in of an even number of binary digits, the digits will be contained in the bistable devices appearing at the left hand side of the drawing of FIGURE 1 and similarly, at the conclusion of the read-in of an odd number of digits, the digits or information will be found in the bistable devices shown on the right hand side of FIGURE 1. As noted from the above description of operation of FIGURE 1, an information digit has been read in and shifted into the shift register at the occurrence of each clock pulse and no delay is needed between the read-in and shifting of information. The circuit requires fewer over-all components and hence achieves greater reliability.

Referring now to FIGURE 4, the circuit may be modified and a single stage of a shift register is shown which requires no resetting. The single stage as shown in FIGURE 4 may be one of the plurality of stages shown in FIGURE 7.

It will be assumed that we wish to place the binary number 0111 into the shift register stage of FIGURE 4 or the shift register of FIGURE 7. Since it is unnecessary that the bistable devices 29 or 37 be reset, it is immaterial what state they may be in before application of the information pulses.

Coincidence occurs at the "and" gate 73 upon application of CP-Odd to the terminal 13 and a pulse representative of the least significant digit of the binary number 0111 at the input terminal 27. The function of the inverter 83 is to convert "one" signals to "zero" signals and "zero" signals to "one" signals. As the input applied to the input terminal 27 was a "one," a "zero" will appear at the output terminal of the inverter 83 over the conductor 81. Therefore, no coincidence appears at the "and" gate 71 and due to the coincidence of pulses at the input terminals of the "and" gate 73, the bistable device 29 is placed in its "one" state thus making the output to the "and" gate 47 from the bistable device 29 "high." We now have the bistable device 29 set into a position representative of a "one" stored therein. Upon the simultaneous application of the next information bit and CP-Even, we will transfer the "one" presently stored in the bistable device 29 to a subsequent stage which can be the stage 87 of FIGURE 7 and also read the new information bit into the bistable device 37 of FIGURE 4. This is accomplished in the following manner: With the simultaneous application of CP-Even to the terminal 15 and a pulse representative of the second least significant digit of the binary number 0111 to the input terminal 27, the information pulse representative of a "one" is passed to the "and" gate 77 thus providing coincidence of inputs only at the "and" gate 77. As a result, the bistable device 37 will be placed in its "one" state. The "one" will be inverted to a "zero" by the inverter 83 as hereinbefore mentioned and the "zero" was transferred to the "and" gates 71 and 75 thus producing no coincidence of inputs at those "and" gates since a "zero" signal may be represented by the absence of a signal.

With the application of CP-Even to the "and" gate 77, it is seen that CP-Even is also passed to the input of the "and" gate 47 over the conductor 93. Since both inputs to the "and" gate 47 are now present, a pulse is passed to the "or" gate 95 and subsequently to a stage of a shift register such as 87 of FIGURE 7. This operation has resulted in the shifting of the least significant digit to the second stage of the shift register and the placing of the second least significant digit in the bistable device 37 of the first stage of the shift register.

The operation of reading in the third least significant digit of the binary number 0111, which is also a "one," is performed similarly to the method of inserting and shifting the first two digits. As a result of reading in the third least significant digit, the digit will be read into the bistable device 29 and the digit already in the bistable device 37 will be shifted to a subsequent stage such as 87 shown in FIGURE 7. The digit previously in the shift register stage 87 of FIGURE 7 will be transferred to the stage 89.

The reading in of the last digit, the "zero" of the binary number 0111 is accomplished by the inversion action of the inverter 83 in converting the "zero" which appeared at the input terminal 27, to a "one" on the conductor 81 and providing coincidence at the "and" gate 75 by the simultaneous application of CP-Even at the terminal 15 and the inverted "zero" information digit. No coincidence will appear at the "and" gate 77 since as hereinbefore mentioned, a "zero" may be represented by the absence of a pulse or by a pulse of a different magnitude than a "one" pulse or signal. As coincidence appeared at the input terminals of the "and" gate 75, the bistable device 37 will be switched to its "zero" state which is representative of the digit which we wished to place in the shift register. It is evident at this point that the bistable device did not require resetting. The bistable device was previously in its "one" state and a "zero," the information we wished to read-in, was applied at the output of the "and" gate 75, thus driving the bistable device 37 into the state that was desired. As previously mentioned, the shifting of the digits already contained in the shift register to later stages is accomplished and the binary number 0111 would now be contained in the shift register as shown in FIGURE 7. The least significant digit is in the shift register stage 91, the next significant digit has been shifted to the stage 89, the next significant digit is in the stage 87 and the last digit, which is a "zero," is in the stage 85. Upon application of the first clock pulse CP-Odd, which was the first odd numbered clock pulse, the "one" was read into the shift register stage 85. Upon application of the second clock pulse CP-Even, which was the first even numbered clock pulse, the "one" was shifted to the stage 87 and the second digit "one" was read into the stage 85. Upon application of the third clock pulse CP-Odd, which was the second odd numbered clock pulse, the "one" of the stage 87 was shifted to the stage 89, the "one" of the stage 85 was shifted to the stage 87 and the third digit, which was a "one," was read into the stage 85. Upon application of the fourth clock pulse CP-Even, which was the second even numbered clock pulse, the three digits now in the shift register stages 85, 87 and 89 were shifted to the right and the "zero," which is the fourth digit of the binary number 0111, was read into the first stage 85. Thus, it is seen that a binary number comprising the digits 0111 has been read into the shift register in the time required for only four clock pulses. The information is now available for further use in the computer circuitry.

The circuits of FIGURES 1 and 4 may be further modified as shown in FIGURE 5. The input circuit to the bistable devices of FIGURE 5 has been modified so that the "ones" of a binary number can be represented by a pulse and inserted at the input terminal 97. The binary digits which are "zeros" are separated from the "ones" and applied as pulses or signals to the terminal 99. The outputs from the bistable devices 29 and 37 of FIGURE 5 have been modified by the addition of "and" gates to the "zero" outputs of the bistable devices 29 and 37 and by the addition of a second "or" gate to separate the "zero" output and the "one" output. The operation of the circuit is the same as herein before described except for the separation of the "zero" and "one" inputs and outputs as previously noted.

In certain mathematical operations, it is necessary or desirable to check the output of each stage of the shift register as it is shifted. This can be accomplished by the coupling of an "or" gate to the "and" gates between stages such as the gates 47 and 57 of FIGURE 1. Such an arrangement is shown in FIGURE 6 which, as stated is a simple modification of one of the shift register stages of FIGURE 1.

The description of operation of the shift registers as herein and before described has been explained in terms of serial shifting. It will be readily understood to anyone skilled in the art that the system is easily adaptable for parallel inputs and/or outputs. Parallel inputs into the shift register stages can be achieved by "or" gates at the inputs to the bistable devices. The parallel outputs from the register can be obtained by locking at the output of the appropriate bistable device.

Thus, as described and shown the shift register is capable of serial as well as parallel inputs and outputs. The shift register is capable of a fast repetition time by simultaneously performing the process of reading out the information and of shifting the information from one stage to the next stage with practically no loss of time in the shifting process. Each clock pulse is utilized to read a digit of information into a bistable device as well as to shift the digit of information which was already in the shift register to a subsequent stage and, in a modification shown, to read-out the information digit. Further, modifications of the shift register have been described which require no resetting thereby reducing the time and the number of components necessary to perform the processes associated with the shift registers.

What is claimed is:

1. A shift register stage comprising, in combination,
a pair of input "and gate means;
a pair of output "and" gate means;
a pair of bistable devices, each being connected to input of an individual one of said output "and" gate means;
input means connected to each of said input "and" gate means;
first clock pulse means connected to input of one of said pair of input "and" gate means and of one of said pair of output "and" gate means;
second clock pulse means connected to input of the other of said pair of input "and" gate means and to the other said pair of output "and" gate means; and
means connecting the outputs of said input "and" gate means and an individual one of said bistable devices, wherein the input "and" gate means connected to one of said clock pulse means is connected to the bistable device associated with the output "and" gate means which is connected to the other of said clock pulse means,
whereby information fed through the input "and" gate means connected to one of said clock pulse means is stored in a bistable device feeding the output "and" gate means connected to the other of said clock pulse means and may be advanced to a subsequent stage simultaneously with the feeding of information to the other input "and" gate means.

2. An initial stage of a shift register comprising
an input circuit having a first "and" gate and a second "and" gate;
an output circuit having a first "and" gate and a second "and" gate;
input means connected to one input of each of said input "and" gates;
first coupling means between another input of said first input "and" gate and an input of said first output "and" gate;
second coupling means between another input of said second input "and" gate and an input of said second output "and" gate;
signal means for applying clock signals in a predetermined manner individually to said first coupling means and to said second coupling means;
storage means comprising a first bistable device and a second bistable device,
(1) said first bistable device being connected between the output of said second input "and" gate and an input of said first output "and" gate, and
(2) said second bistable device being connected between the output of said first input "and" gate and an input of said second output "and" gate;
first reset means for applying signals to said first bistable device simultaneously with said clock signals to said second coupling means; and
second reset means for applying said signals to said second bistable device simultaneously with said clock signals to said first coupling means.

3. The combination as defined in claim 2 wherein said clock signals are separated into "odd" signals and "even" signals, said "odd" signals are applied to said first coupling means, and said "even" signals are applied to said second coupling means.

4. A shift register having a plurality of successive stages comprising
an initial stage as defined in claim 2;
at least one other successive stage, having
(1) storage means comprising a first bistable device and a second bistable device,
(2) an output circuit comprising a first output "and" gate and a second output "and" gate,
(3) an input of said first output "and" gate being coupled to said first bistable device, and (4) an input of said second output "and" gate coupled to said second bistable device, interstage coupling means connecting (1) said first and second bistable devices of said successive stage respectively to the outputs of the second and first output "and" gates of the preceding stage, (2) another input of said first and second output "and" gates of said successive stage respectively to said first and second coupling means of said initial stage, and (3) said first and second bistable devices of said successive stage respectively to said first and second reset means.

5. A shift register having at least one stage comprising a first and a second pair of input "and" gates;

input means connected to one input of one of each pair of input "and" gates;

inverter means connected between said input means and one input of each of the other of said pair of input "and" gates;

a first and a second bistable device, each of said bistable devices having an input for each stable state and an output for one of the stable states, means coupling the outputs of said first and second pairs of input "and" gates respectively, individually, and in the same order, to the inputs of said first and second bistable devices;

first and second output "and" gates;

means coupling the outputs of said first and second bistable devices respectively to inputs of said first and second output "and" gates;

and "or" gate having a pair of inputs and an output;

means coupling the outputs of said output "and" gates to the inputs of said "or" gate;

first connecting means between another input of each of said first pair of input "and" gates and another input of said second output "and" gate;

second connecting means between another input of each of said second pair of input "and" gates and another input of said first output "and" gate;

means for applying clock signals in a predetermined manner individually to said first connecting means and to said second connecting means.

6. The combination as defined in claim 5 wherein said clock signals are separated into "odd" signals and "even" signals; said "odd" signals being applied to said first connecting means and said "even" signals being applied to said second connecting means.

7. A shift register having at least one stage comprising a "zero" signal input means, and a "one" signal input means;

a first pair of input "and" gates and a second pair of input "and" gates;

first and second bistable devices each having a "zero" state and a "one" state and each having an input and an output for each state;

a pair of output "and" gates for each bistable device, each of said pair having an input connected individually to an output of one of the states of the bistable device;

first and second "or" gates;

means coupling said "zero" signal input means to an input of one of each of said pairs of input "and" gates and means coupling said "one" signal input means to an input of the other of each of said pairs of input "and" gates;

individual connections between the outputs of said input "and" gates connected to said "zero" input means and the "zero" state of said bistable devices;

individual connections between the outputs of said input "and" gates connected to the "one" input means and the "one" state of said bistable devices;

connections between the outputs of said output "and" gates connected to the "zero" states of said pair of "bistable devices and inputs of said first "or" gate;

connections between the outputs of said output "and" gates connected to the "one" state of said bistable devices and inputs of said second "or" gate;

first connecting means between another input of each of said first pair of input "and" gates and another input of each of said second pair of output "and" gates;

second connecting means between another input of each of said second pair of input "and" gates and another input of each of said first pair of output "and" gates; and means for applying clock signals in a predetermined manner individually to said first connecting means and to said second connecting means.

References Cited in the file of this patent

UNITED STATES PATENTS

| | | |
|---|---|---|
| 2,723,080 | Curtis | Nov. 8, 1955 |
| 2,819,395 | Jones | Jan. 7, 1958 |
| 2,843,841 | King et al. | July 15, 1958 |
| 2,876,004 | Sink | Mar. 3, 1959 |
| 2,911,544 | Ostendorf | Nov. 3, 1959 |

OTHER REFERENCES

"Unitized Pulse Circuits," Electronics, October 1952, p. 156 relied on.